United States Patent
Weddell et al.

(10) Patent No.: US 7,513,289 B2
(45) Date of Patent: Apr. 7, 2009

(54) SLIDE-LATERAL ARM BOX AWNING FOR MOTOR HOME AND RECREATIONAL VEHICLE USE

(75) Inventors: Vince Weddell, Irvine, CA (US); Robert G. Heitel, Laguna Beach, CA (US)

(73) Assignee: Girard Systems, San Clemente, CA (US)

( * ) Notice: Subject to any disclaimer, the term of this patent is extended or adjusted under 35 U.S.C. 154(b) by 824 days.

(21) Appl. No.: 10/863,538

(22) Filed: Jun. 7, 2004

(65) Prior Publication Data

US 2005/0269036 A1    Dec. 8, 2005

(51) Int. Cl.
*E04F 10/06* (2006.01)

(52) U.S. Cl. ............................. 160/22; 160/55; 160/67; 160/122

(58) Field of Classification Search .................... 160/22, 160/55, 66, 67, 120, 122; 135/88.11, 88.12
See application file for complete search history.

(56) References Cited

U.S. PATENT DOCUMENTS

| | | | | |
|---|---|---|---|---|
| 512,273 A | | 1/1894 | Brown | |
| 2,609,042 A | * | 9/1952 | Chamberlain | 160/122 |
| 3,050,075 A | * | 8/1962 | Kaplan et al. | 296/98 |
| 3,991,805 A | * | 11/1976 | Clauss | 160/22 |
| 4,214,621 A | * | 7/1980 | Wessels et al. | 160/66 |
| 4,615,371 A | | 10/1986 | Clauss | |
| 4,641,805 A | | 2/1987 | Martensson, IV | |
| 5,170,811 A | * | 12/1992 | Kirk et al. | 135/88.11 |
| 5,171,056 A | | 12/1992 | Faludy et al. | |
| 5,280,687 A | | 1/1994 | Boiteau | |
| 5,752,536 A | | 5/1998 | Becker | |
| 5,860,440 A | | 1/1999 | Murray et al. | |
| 6,123,136 A | | 9/2000 | Williams | |
| 6,269,824 B1 | | 8/2001 | Brutsaert | |
| 6,619,726 B2 | | 9/2003 | Jones | |
| 6,662,849 B1 | * | 12/2003 | Hsiung | 160/122 |

* cited by examiner

*Primary Examiner*—David Purol
(74) *Attorney, Agent, or Firm*—Walter A. Hackler

(57) ABSTRACT

A slide-lateral arm box awning system for motor homes and recreational vehicles having an extendable coach slider includes a encasement, a slider awning and a lateral arm awning. First and second roll bars are disposed within the encasement and attached respectively to the slider awning and the lateral arm awning within the encasement. Independent of operation of the roll bars enables independent operation of the slider awning and the lateral bar awning.

19 Claims, 1 Drawing Sheet

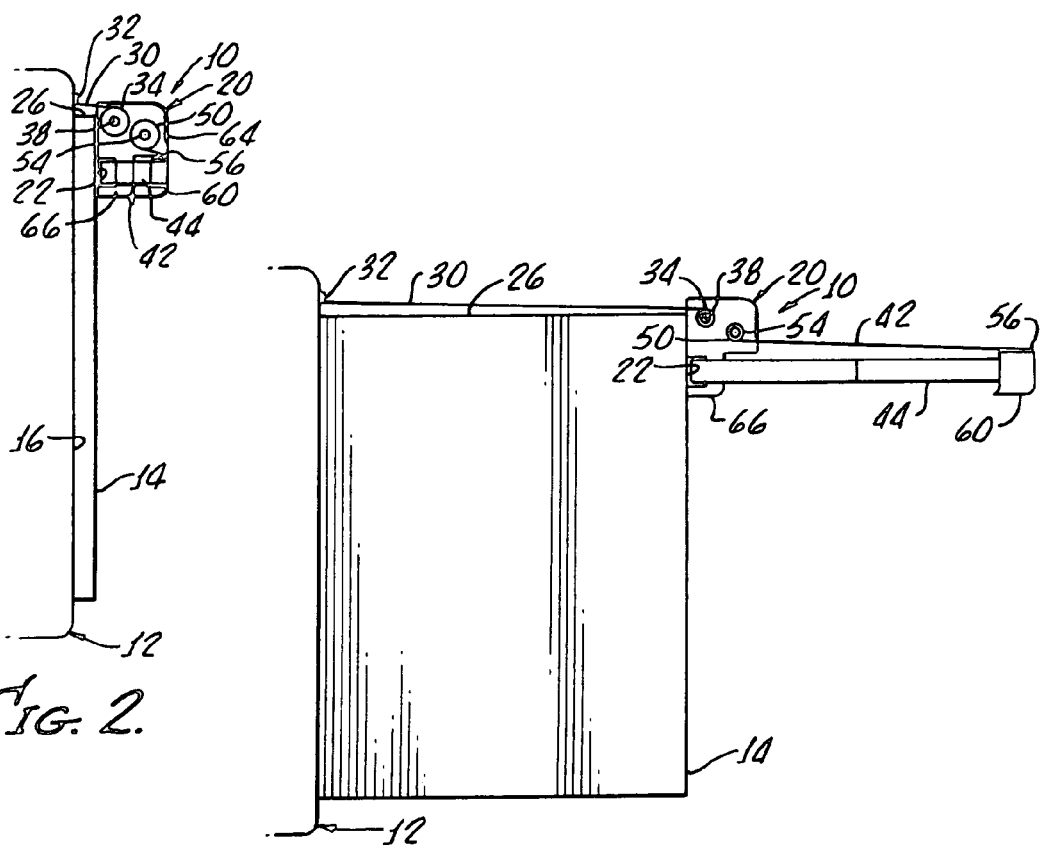
Fig. 2.
Fig. 3.
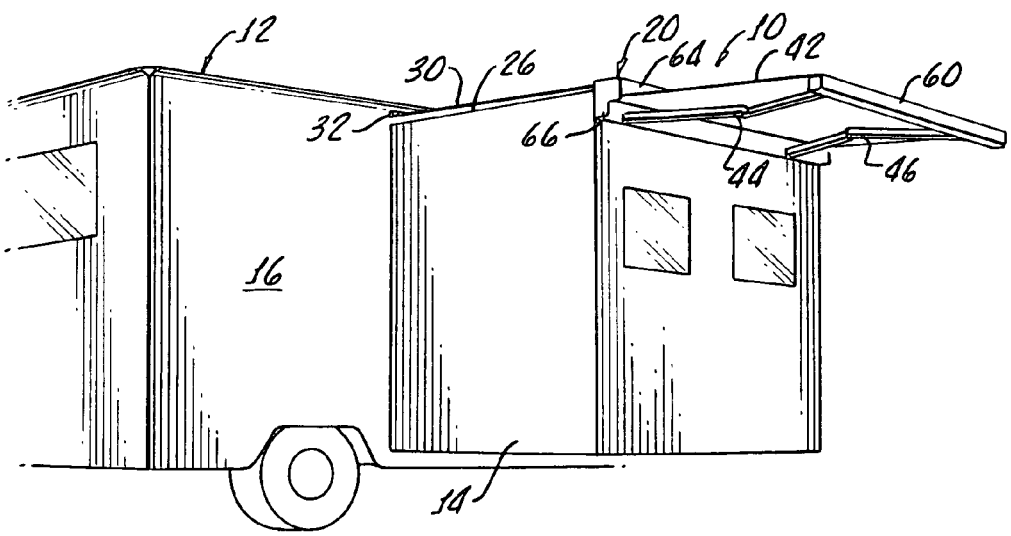
Fig. 1.

SLIDE-LATERAL ARM BOX AWNING FOR MOTOR HOME AND RECREATIONAL VEHICLE USE

The present invention is generally related to retractable awnings and is more particularly directed to a slide-lateral arm box awning for use on a slide out unit of a movable home, recreational vehicle or the like.

Many motor homes and recreational vehicles utilize retractable slide out portions in order to enlarge the amount of room available within the recreational vehicle during stationary positioning of the vehicle.

The slide out is completely retracted into the vehicle when the vehicle is traveling.

When in the extended position, slide out units typically accumulate environmental debris, such as, for example, leaves and the like which may be undesirably retracted within the vehicle with the slide out portion.

To overcome this problem, a number of retractable awning systems have been developed as, for example, set forth in U.S. Pat. Nos. 5,171,056, 5,280,687, 5,752,536, 5,860,440, and 6,619,726.

In addition, it is desirable to provide a shaded or sheltered area adjacent a recreational vehicle. The awnings hereinabove referenced while preventing debris from accumulating, have a coach slider may also be further extended to provide a covered area adjacent the slider which shelters the area from sun and rain when the vehicle is parked at a campsite or the like.

Unfortunately, in most cases these awnings cannot be independently operated to provide shelter adjacent the vehicle with the coach slider either extended or not extended. A further disadvantage of the known art is the fact that support arms or legs must be provided which are either hingeably attached to the coach or the slider. Such supports are condusive to generation of wind noise since they cannot be fully retracted to positions within the coach or the slider.

The present invention provides for a combination slide-lateral arm box awning system which provides for independently covering a coach slider to prevent accumulation of debris and further providing a sheltered area along side the coach slider whether it be extended or retracted. Further, the system in accordance with the present invention is compact, easy to install and provides minimum wind resistance.

SUMMARY OF THE INVENTION

A slide-lateral arm box awning system, in accordance with the present invention, is provided for motor homes and recreational vehicles having an extendable coach slider. The system generally includes an elongate encasement having a back wall for fixing the encasement along a top of the coach slider. A slider awning is provided for extending over the coach slider and a first roll bar is disposed within the encasement and attached to the slider awnings for rolling the slider awning thereabout within the encasement.

A lateral arm awning is provided along with a second roll bar disposed within the encasement and attached to the lateral arm awning for rolling the lateral arm awning thereabout within the encasement. Lateral arms attached to the lateral arm awning are provided for extending and retracting the lateral arm awning from and toward the encasement.

More particularly, the second roll bar is operable, independent of operation of the first roll bar for rolling the lateral arm awning. This enables a sheltered area to be provided adjacent the coach slider whether the coach slider is extended from the coach sidewall or retracted within the vehicle.

More specifically, the slide awning includes first end for attachment to a coach sidewall and the slide awning includes a second end for attachment to the roll bar. The lateral arm awning includes a first end attached to the second roll bar and a header is provided and attached to a second end of the lateral arm awning.

Preferably, two lateral arms are attached to the header and the encasement includes an upper portion and a lower portion with the upper portion overhanging the lower portion. This structure enables the lateral arms to be fixed to the encasement lower portion with the arms disposed beneath the encasement upper portion with the header fully retracted in order to provide a streamlined profile to minimize wind noise when the vehicle is in motion.

Still more particularly, the first and second roll bars may be disposed in the encasement upper portion and the slider awning is extendable through the encasement back wall over the coach slider. The lateral awning is extendable through the encasement upper portion over the lateral arms.

BRIEF DESCRIPTION OF THE DRAWINGS

The advantages and features of the present invention will be better understood by the following description when considered in conjunction with the accompanying drawings in which:

FIG. 1 is a perspective view of a slide-lateral arm box awning system in accordance with the present invention for a recreational vehicle shown with a coach slider extended, the system including an elongate encasement attached along the coach slider and shown with a slider awning extended over the coach slider and a lateral arm awning extended from the slider to provide a sheltered area adjacent thereto;

FIG. 2 is a side view, in partial cross section, of the system in accordance with the present invention generally showing first and second roll bars for rolling the slider awning and lateral arm awning respectively; and FIG. 3 is a view similar to that shown in FIG. 2 with the coach slider extended.

DETAILED DESCRIPTION

With reference to FIG. 1, there is shown a slide-lateral box arm awning system 10 in accordance with the present invention for a motor home or recreational vehicle 12 having a coach slider 14, which is extendable from a sidewall 16 of the vehicle 12 as shown in FIG. 1.

FIGS. 2 and 3 are side views of the system 10 showing a coach slider 14 and a retracted position and an extended position respectively. Operation of the coach slider 14 and a mechanism for enabling extension and retraction from the vehicle 12 are not part of the present invention.

The system 10 includes a encasement 20 having a back wall 22 for fixing the encasement 20 along a top 26 of the slider, as best shown in FIGS. 2 and 3.

A slider awning 30 is provided for extending over the coach slider top 26 and includes a first end 32 for attachment to the coach sidewall 16 and a second end 34 attached to a first roll bar 38, which is provided for rolling the slider awning 30 thereabout within the casement 20 in a conventional manner. Such slider roll bars are described, for example, in U.S. Pat. No. 5,752,536 which is incorporated herewith in its entirety for illustrating the type of roll bar mechanism suitable for the slider awning 30.

It should be appreciated that in FIG. 2, the slider 14 is shown in a slightly ajar position from the coach sidewall 16 in order to illustrate the positioning of the slider awning. In transit, the slider 14 would be in a flush position with the coach sidewall 16.

A lateral arm awning 42 is provided, extendable over lateral arms 44, 46, and having a first end 50 attached to a second roll bar 54 and a second end 56 attached to a header 60.

Examples of suitable lateral arms 44, lateral awnings 42 are discussed in U.S. Pat. No. 4,615,371 and U.S. patent application Ser. No. 10/366,952, "Awning System For a Recreational Vehicle" filed Feb. 14, 2003. Both of these references are incorporated herewith in their entirety for illustrating the type of lateral arm 44 and lateral arm awning 42 mechanisms suitable for use in the present invention. In view of these teachings, detailed structure and operation of the lateral arm awning 42 is omitted herewith for clarity.

As shown, the first roll bar 38 and second roll bar 54 are independently mounted for rotation within the casement 20 and this enables independent operation of the slider awning 30 and lateral arm awning 42 by a control system, not shown, this feature enables the extension of the lateral arm awning 42 from the slider 14 whether or not the slider 14 is extended from the coach 12.

In order to provide a compact and streamline system 10, the encasement 20 include an upper portion 64 which overhangs a lower portion 66 and the lateral arms 44, 46 are fixed to the encasement lower portion 66 in order that the lateral arms 44, 46 may be disposed beneath the encasement upper portion 64 with the header 60 fully retracted, see FIG. 2.

Although there has been hereinabove described a specific slide-lateral arm box awning for motor home and recreational vehicle use in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A slide-lateral arm box awning system for motor homes and recreational vehicles having an extendable coach slider, the system comprising:
    an elongate encasement having a back wall for fixing said elongate encasement along a top of the coach slider;
    a slider awning for extending over the coach slider;
    a first roll bar disposed in the encasement and attached to said slider awning for rolling said slide awning thereabout within the encasement;
    a lateral arm awning;
    a second roll bar disposed in the encasement and attached to said lateral arm awning for rolling said lateral arm awning thereabout within the encasement; and
    lateral arms attached to said lateral arm awning for extending and retracting said lateral arm awning from and toward the encasement.

2. The system according to claim 1 wherein said second roll bar is operable, independent of operation of said first roll bar, for rolling said lateral arm awning.

3. The system according to claim 1 wherein said slider awning includes a first end for attachment to a coach sidewall.

4. The system according to claim 3 wherein said slider awning includes a second end for attachment to said first roll bar.

5. The system according to claim 4 wherein said lateral arm awning includes a first end attached to said second roll bar.

6. The system according to claim 5 further comprising a header attached to a second end of said lateral arm awning.

7. The system according to claim 6 further comprising two lateral arms attached to said header.

8. The system according to claim 7 wherein the encasement includes an upper portion and a lower portion, said upper portion overhanging said lower portion.

9. The system according to claim 8 wherein the lateral arms are fixed to the encasement lower portion with the arms disposed beneath the encasement upper portion with the header fully retracted.

10. The system according to claim 9 wherein the first and second roll bars are disposed in the encasement upper portion.

11. The system according to claim 10 wherein said slider awning is extendable through the encasement back wall over said coach slider.

12. The system according to claim 11 wherein said lateral awning is extendable through the encasement upper portion over the arms.

13. A slide-lateral arm box awning system for motor homes and recreational vehicles having a sidewall with a coach slider extendable from said sidewall, the system comprising:
    an elongate encasement having a back wall for fixing said elongate encasement along a top of said coach slider;
    a slider awning having a first and a second end, said first end being fixable to said sidewall;
    a first roll bar disposed in the encasement and attached to said slider awning second end for rolling said slider awning thereabout within the encasement;
    a lateral arm awning having a first end and a second end;
    a second roll bar disposed in the encasement and attached to the lateral arm awning first end for rolling said lateral arm awning thereabout within the encasement;
    a header attached to said lateral arm awning second end; and
    a pair of lateral arms fixed to the encasement and said header for extending and retracting said header and said lateral arm awning from and toward the encasement.

14. The system according to claim 13 wherein said second roll bar is operable, independent of operation of said first roll bar, for rolling said lateral arm awning.

15. The system according to claim 13 wherein the encasement includes an upper portion and a lower portion, said upper portion overhanging said lower portion.

16. The system according to claim 15 wherein the lateral arms are fixed to the encasement lower portion with the arms disposed between the encasement upper portion with the said header fully retracted.

17. The system according to claim 16 wherein the first and second roll bars are disposed in the encasement upper portion.

18. The system according to claim 17 wherein said slider awning is extendable through the encasement back wall over the coach slider.

19. The system according to claim 18 wherein said lateral awning is extendable through the encasement upper portion over the arms.

* * * * *